US010936388B2

(12) United States Patent
Leggette

(10) Patent No.: US 10,936,388 B2
(45) Date of Patent: *Mar. 2, 2021

(54) SLICE METADATA FOR OPTIMIZED DISPERSED STORAGE NETWORK (DSN) MEMORY STORAGE STRATEGIES

(71) Applicant: International Business Machines Corporation, Armonk, NY (US)

(72) Inventor: Wesley B. Leggette, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/425,836

(22) Filed: May 29, 2019

(65) Prior Publication Data
US 2019/0278649 A1 Sep. 12, 2019

Related U.S. Application Data

(63) Continuation of application No. 15/720,140, filed on Sep. 29, 2017, now Pat. No. 10,409,661.

(51) Int. Cl.
G06F 11/00 (2006.01)
G06F 11/07 (2006.01)
(Continued)

(52) U.S. Cl.
CPC ...... G06F 11/0727 (2013.01); G06F 11/1076 (2013.01); G06F 11/1464 (2013.01);
(Continued)

(58) Field of Classification Search
None
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

P. Leach, P. Levine, B. Douros, J. Hamilton, D. Nelson and B. Stumpf, "The Architecture of an Integrated Local Network," in IEEE Journal on Selected Areas in Communications, vol. 1, No. 5, pp. 842-857, Nov. 1983, doi: 10.1109/JSAC.1983.1146002. (Year: 1983).*

(Continued)

Primary Examiner — Daniel F. McMahon
(74) Attorney, Agent, or Firm — James Nock; Andrew D. Wright; Roberts Calderon Safran & Cole, P.C.

(57) ABSTRACT

A method begins by a dispersed storage (DS) processing unit of a dispersed storage network (DSN) generating a hint regarding data stored or to be stored. When the data is to be stored, the DS processing module divides the data into data segments and dispersed storage error encodes a data segment of the data segments to produce a set of encoded data slices. The method continues by the DS processing unit generating a set of hints based on the hint and affiliating the set of hints with the set of encoded data slices to produce a set of affiliated encoded data slices. The method continues by the DS processing unit sending the set of affiliated encoded data slices to a set of storage units of the DSN such that a storage unit of the set of storage units stores an encoded data slice in accordance with a corresponding hint.

17 Claims, 6 Drawing Sheets

(51) Int. Cl.
  *G06F 11/30* (2006.01)
  *G06F 11/14* (2006.01)
  *G06F 11/10* (2006.01)
  *H04L 29/08* (2006.01)
(52) U.S. Cl.
  CPC .... *G06F 11/3006* (2013.01); *H04L 29/08549* (2013.01); *H04L 67/1097* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,612,827 | B2 * | 12/2013 | Gladwin ................ G06F 21/10 714/760 |
| 9,201,805 | B2 * | 12/2015 | Baptist ................ G06F 11/1076 |
| 10,409,661 | B2 | 9/2019 | Leggette |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2016/0224403 | A1 * | 8/2016 | Gladwin ............. G06F 11/0718 |
| 2016/0328296 | A1 * | 11/2016 | Abhijeet ............. H04L 67/1097 |
| 2017/0116080 | A1 * | 4/2017 | Marchant ............. G06F 3/0665 |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

List of IBM Patents or Patent Applications Treated as Related, dated Aug. 6, 2020, 1 page.

* cited by examiner

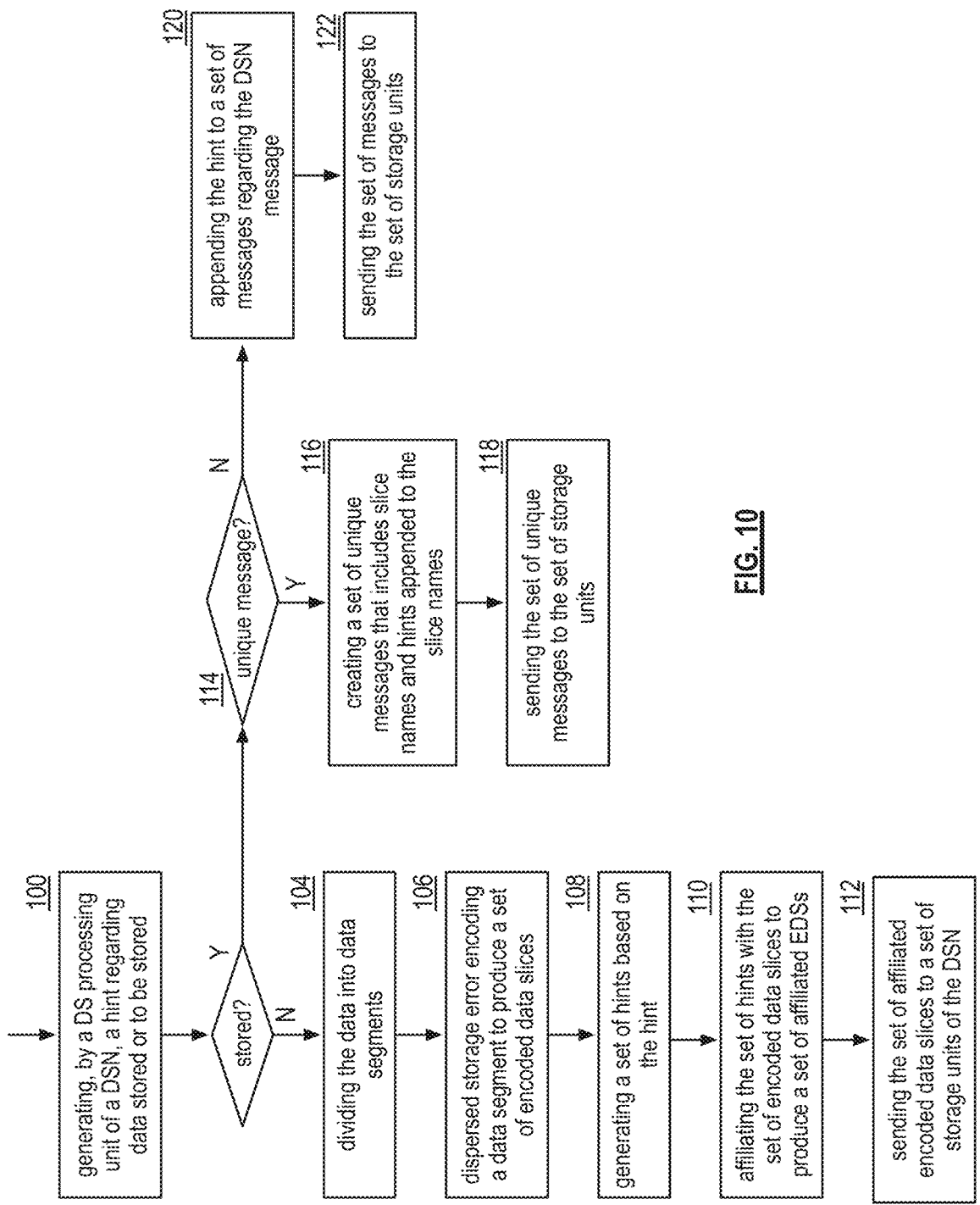

SLICE METADATA FOR OPTIMIZED DISPERSED STORAGE NETWORK (DSN) MEMORY STORAGE STRATEGIES

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 10 is a logic diagram of an example of a method of generating hints in accordance with the present invention.

DETAILED DESCRIPTION OF THE INVENTION

Figure 1:
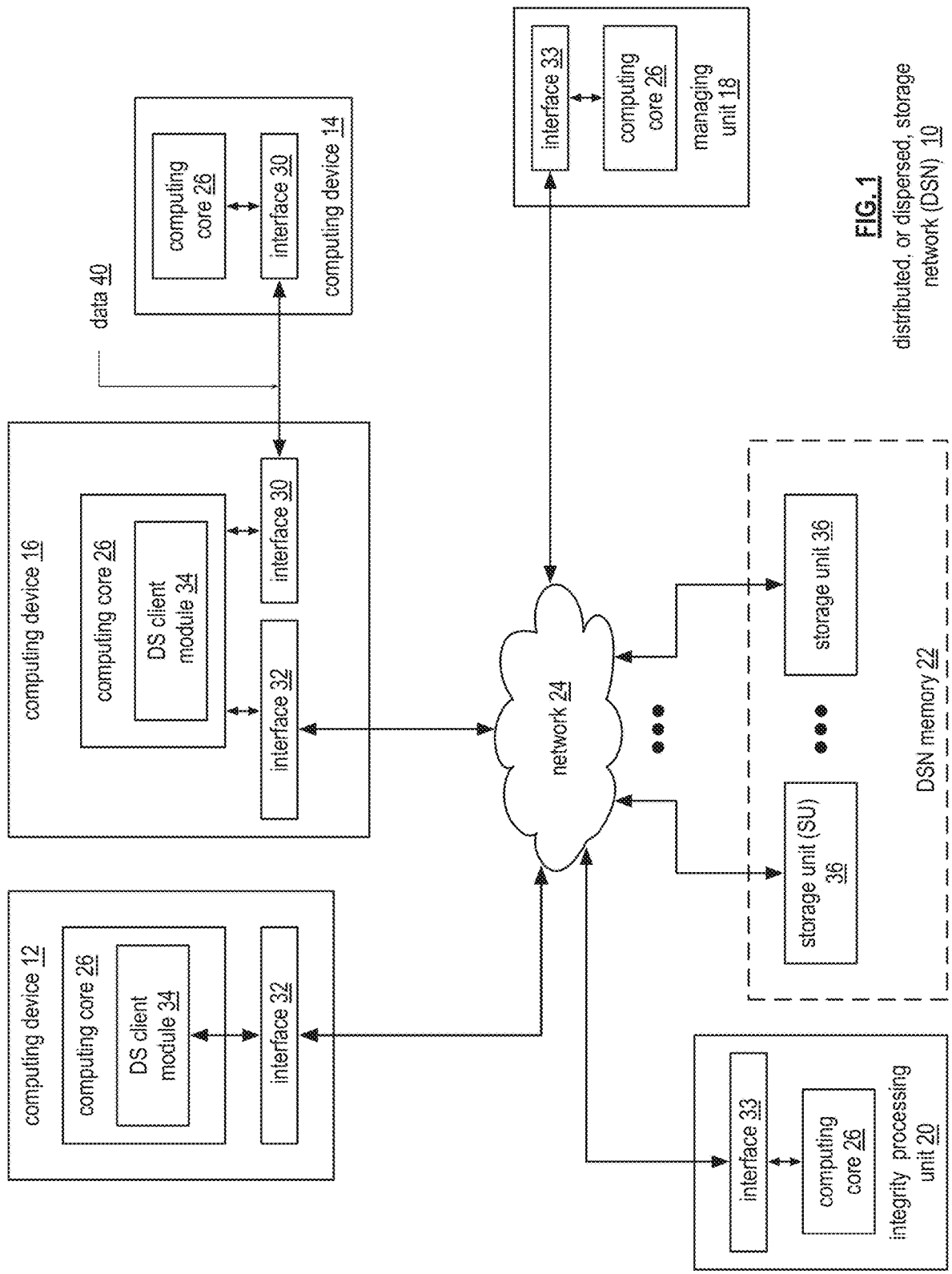
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
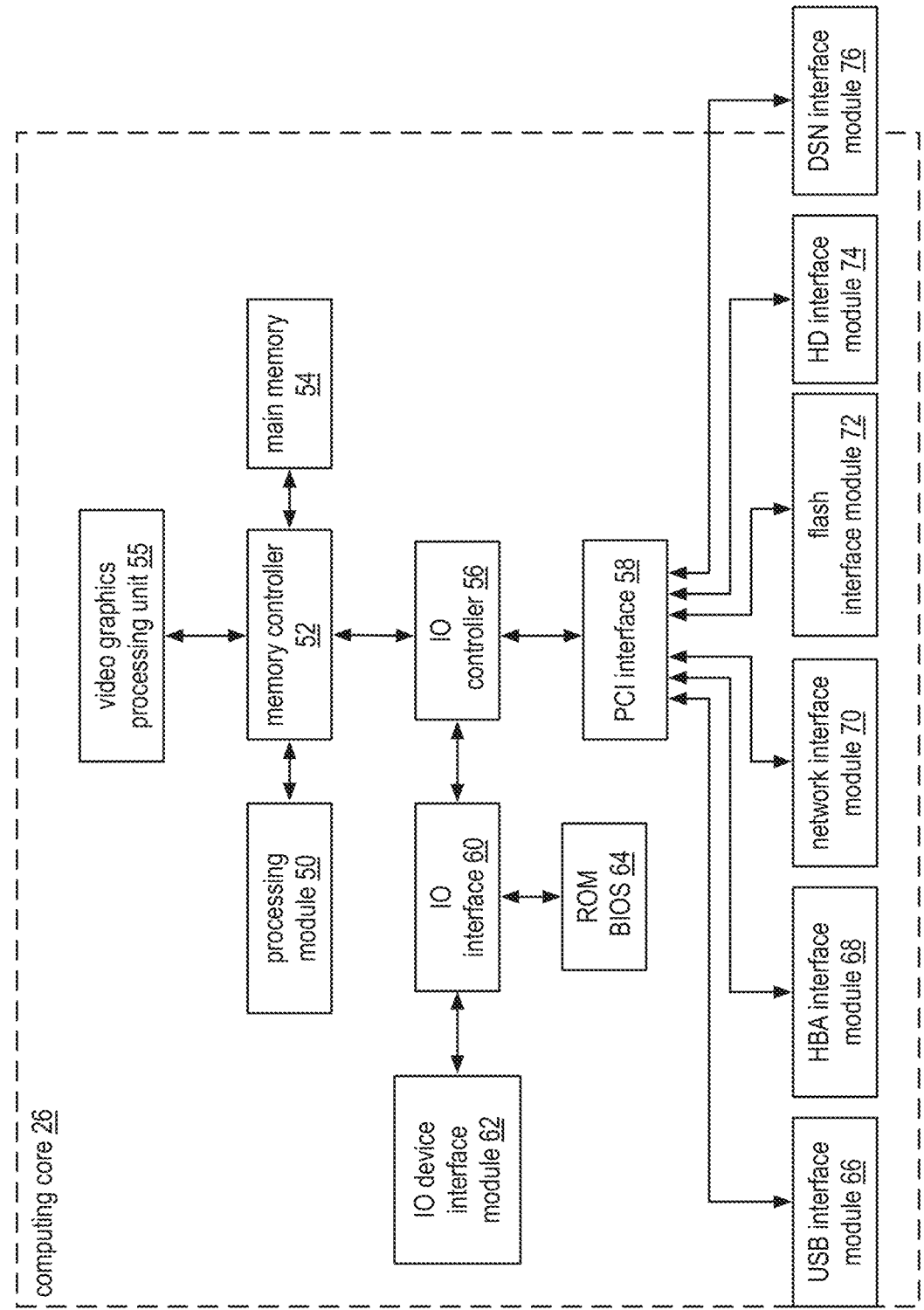
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data 40 on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
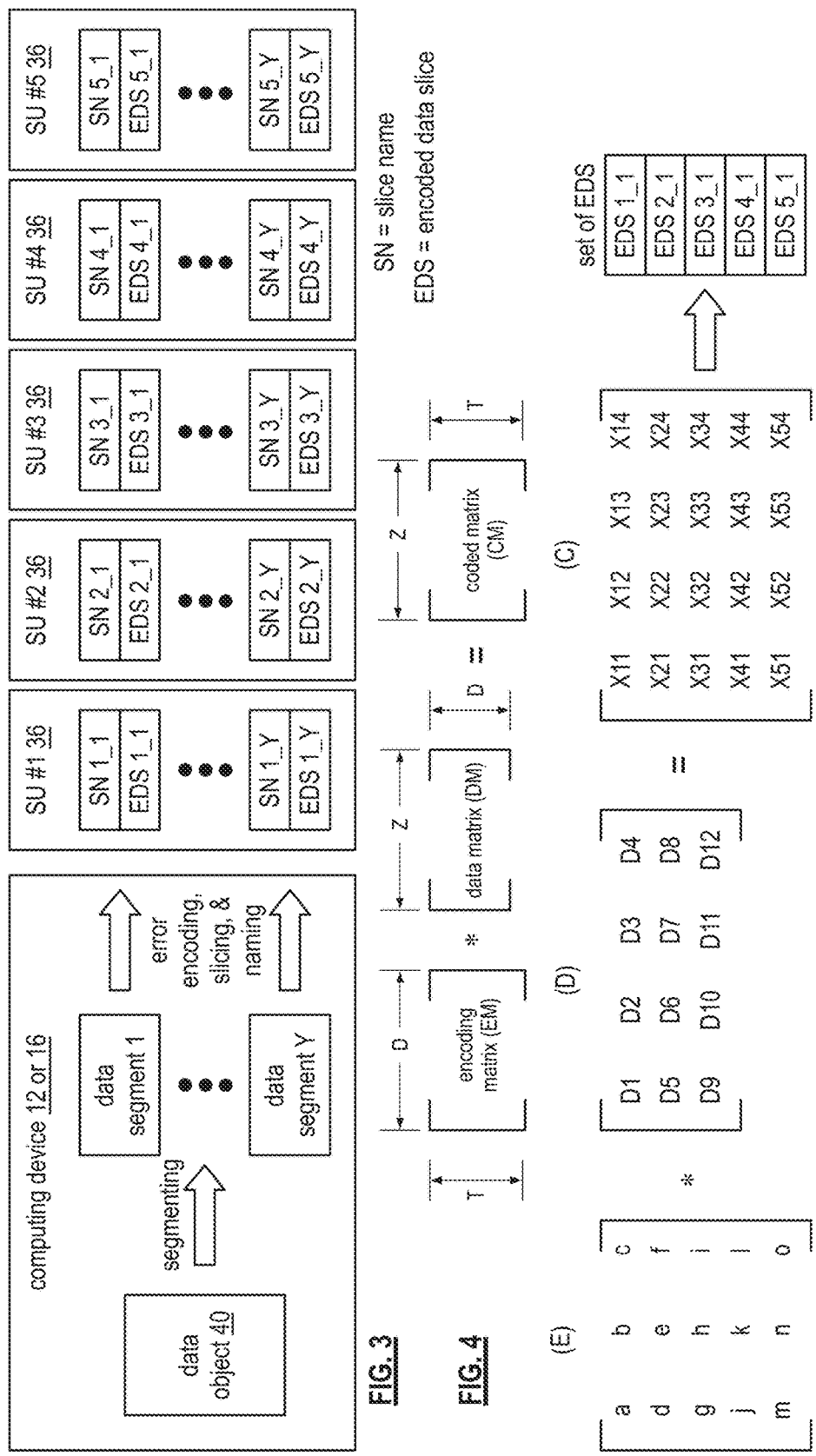
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
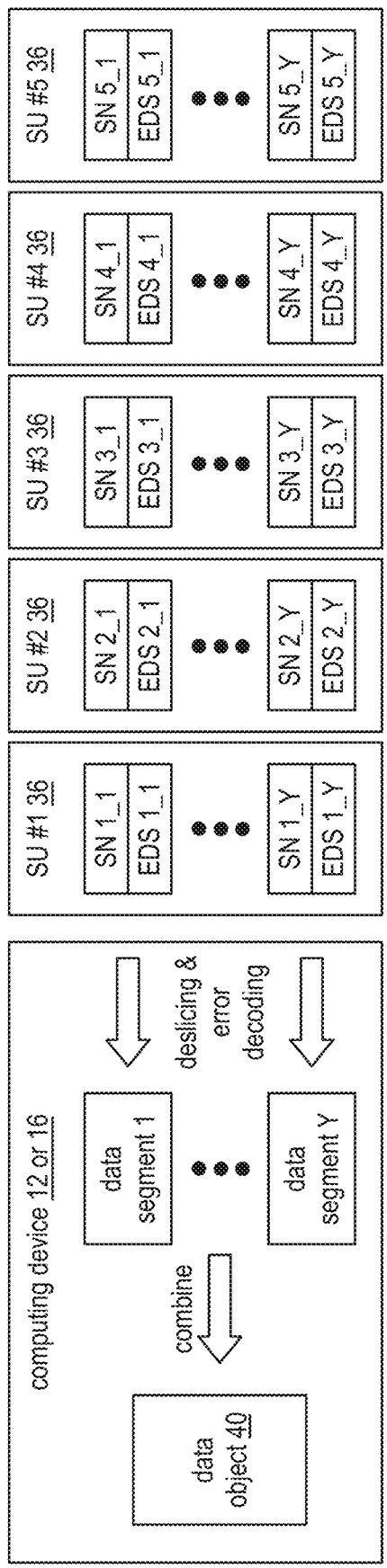
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
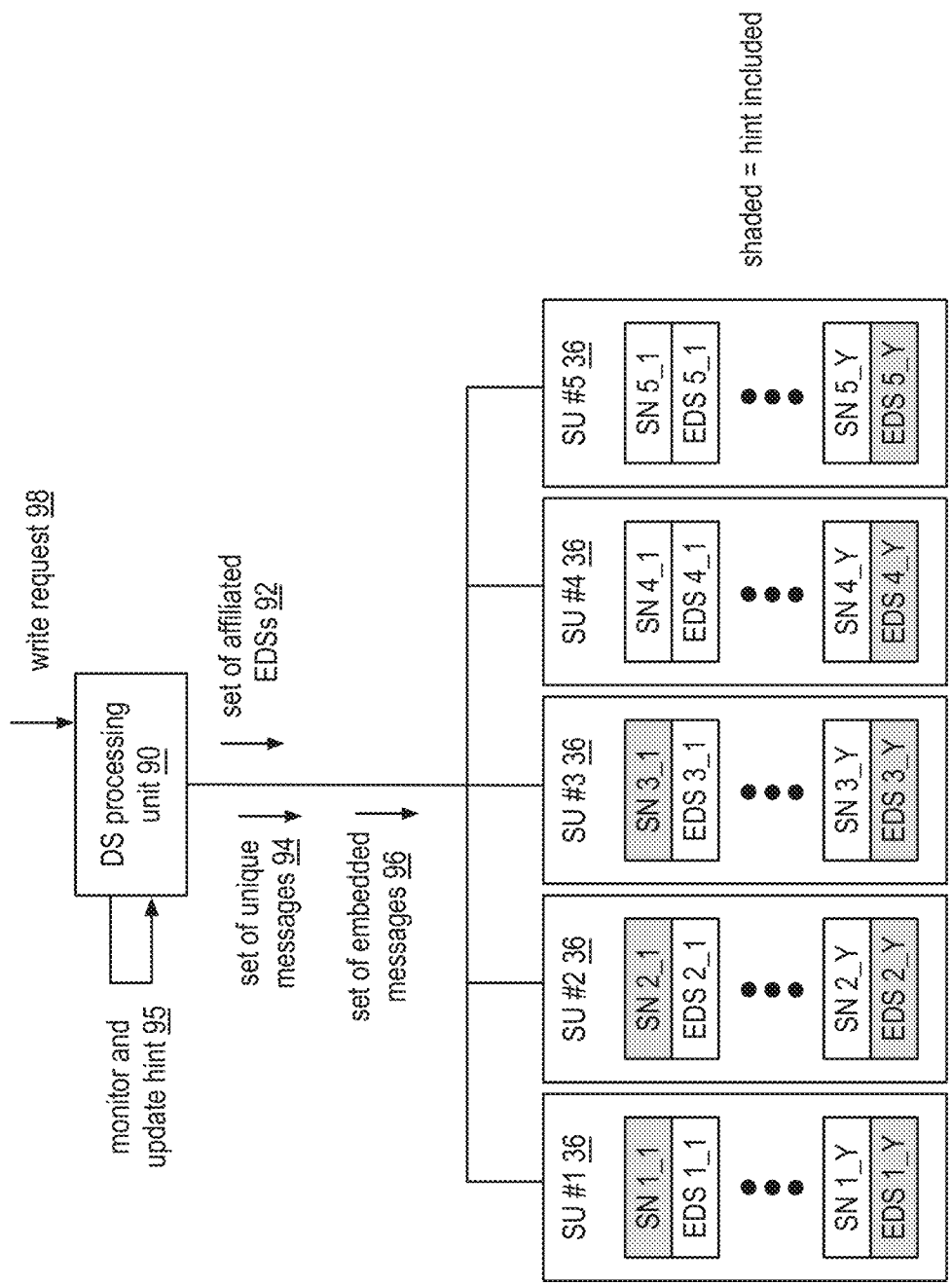
FIG. 9 is a schematic block diagram of an example of generating hints in accordance with the present invention.

FIG. 9 is a schematic block diagram of a dispersed storage network (DSN). The DSN includes a DS processing unit 90 and a set of storage units SU #1-5 36. The DS processing unit 90 may be implemented by one of the computing devices 12-16, the managing unit 18, the integrity processing unit 20, and the DS client module 34 of FIG. 1. The set of storage units 36 store sets of encoded data slices (e.g., EDS 1_Y-EDS 5_Y, etc.) and corresponding sets of slice names (e.g., SN 1_Y-SN 5_Y, etc.). The sets of slices names and the sets of encoded data slices may also include a hint, shown in FIG. 9 by shading. For example, slice name 1_1, 2_1, and 3_1 and encoded data slices EDS 1_Y, 2_Y, 3_Y, 4_Y and 5_Y include a hint. A hint includes one or more storage directives. The storage directives include a type of data, a location constraint, a modification constraint, an access frequency, an expected access latency, a desired access latency, a security requirement, and a compression requirement.

The DS processing unit 90 generates hints regarding data stored, or to be stored in the set of storage units 36. As an example of generating the hint, the DS processing unit 90 interprets the data in write request 98 or stored in the set of storage unit 36, to determine the data's data characteristics (e.g., size). As another example of generating the hint, the DS processing unit interprets ancillary data (e.g., data that cannot be interpreted directly from the data (e.g., encryption type, security requirements, non-modifiable data, write-once-read-many write, etc.)) of the data to determine one or more storage requests. As yet a further example, the DS processing unit 90 may generate the hint by monitoring and updating the hint 95 regarding stored data. As yet another example of generating the hint, the DS processing unit 90 may interpret an update to the ancillary data to determine updated storage requests. For example, the DS processing unit 90 may determine the access frequency of a stored data object, a set of encoded data slices or an excess number of encoded data slices (e.g., encoded data slices greater than a reliability threshold) has dropped below a high access frequency threshold. Having determined the access frequency is below the high access frequency threshold, the DS processing unit 90 updates the hint associated with the stored data object or the set of encoded data slices or the excess number of encoded data slices, and generates a set of unique messages 94 that includes the updated hint. The DS processing unit 90 then sends the set of unique messages 94 to the set of storage units 36.

A storage unit 36 that receives one of the unique messages 94, may interpret the unique message 94 and determine to modify the hint and or storage of data corresponding with the hint based on one or more of, the unique message, a hint protocol (e.g., when hints are required to be followed, when hints are optional, etc.), and the storage parameters of the storage unit 36. For example, the storage unit 36 interprets the unique message 94 of access frequency below a high access frequency threshold, the hint protocol of use when optimal and the storage parameters indicating a more optimal storage location within the storage unit is available to determine to update the hint associated with the stored and to move the location of storage of the data.

In an example of operation, the DS processing unit 90 receives a write request that includes data to be stored and generates a hint that includes a storage directive of a location constraint based on the size of the data. Next, the DS processing unit 90 divides the data into segments and dispersed storage error encodes a data segment to produce a set of encoded data slices. Next, the DS processing unit 90 generates a set of hints based on the hint. For example, each hint of the set of hints may correspond with an encoded data slice. As another example, a first subset of hints may correspond to a decode threshold number of encoded data slices and a second subset of hints may correspond to a pillar width number minus the decode threshold number of encoded data slices. As a further example, a first subset of hints may correspond to a write threshold number of encoded data slices and a second subset of hints may correspond to a pillar width number minus the write threshold number of encoded data slices. As yet a further example, a first subset of hints may correspond to a read threshold number of encoded data slices and a second subset of hints may correspond to a write threshold number of encoded data slices. Note each hint of the respective subsets of hints may be substantially similar to other hints in the subset of hints. Further note that, from subset of hints to subset of hints, at least one storage directive of one of the subset of hints may not be substantially similar to storage directives of the other subset of hints.

In one instance, the DS processing unit 90 may generate the hint by generating a first hint that includes a first one or more desired storage directives and by generating a second hint that includes a second one or more desired storage directives. Note one or more of the first one or more desired storage directives may not be substantially similar to one or more of the second one or more desired storage directives. In an example, the first hint includes storage directives of a desired access latency and a high compression requirement, while the second hint includes storage directives of a security requirement (e.g., encryption type, encoding type, etc.).

As another example, the first hint includes storage directives of a desired access latency and a high security requirement, while the second hint includes storage directives of a less desired access latency and a low security requirement. Note a storage unit, upon receiving the first and second hints from the DS processing unit, may determine whether or not to use either of hint, or may be directed to use at least one of the hints. Further note, the storage unit may attempt to use the first hint, and if unable to use the first hint (e.g., the storage unit is unable to provide an expected access latency, the storage unit cannot store data associated with the hint due to a location constraint, etc.), may then use the second hint for processing corresponding data.

Having generated the set of hints, the DS processing unit 90 produces set of affiliated encoded data slices 92 by affiliating the set of hints with the set of encoded data slices. For example, the DS processing unit 90 affiliates the set of hints with the set of encoded data slices by appending a corresponding hint of the set of hints to an encoded data slice to produce an affiliated encoded data slice 92 of the set of affiliated encoded data slices 92. Note that the appending may be to any known location of the encoded data slice. For example, any two bits of the encoded data slice may function as the hint bits. As another example, the last four bits of the encoded data slice function as the hint bits.

As another example, the DS processing unit 90 affiliates the set of hints with the set of encoded data slices by appending a corresponding hint of the set of hints to a slice name of the encoded data slice to produce an affiliated encoded data slice 92 of the set of affiliated encoded data slices 92. Note the appending may be to anywhere in the slice name where a storage unit can easily determine the hint.

In another example of operation, when data is stored, the DS processing unit 90 generates the hint and determines whether to send the hint as a unique message 94 or embedded in a DSN message 96. For example, when the hint is urgent (e.g., massive demand for data with a low access latency and high access frequency), the DS processing unit 90 may determine to send a set of unique messages 94 to the set of storage units 36. As another example, when the hint is not urgent (e.g., access frequency is expected to decrease in ten minutes) the DS processing module may determine to send the hint embedded 96 with a future DSN message (e.g., a list request, a digest request, a read request, an update request, an edit request, a revision level update request, a rebuild request, etc.) for corresponding data by appending the hint to a set of messages regarding the DSN message 96.

FIG. 10 is a logic flow diagram of a method of generating slice metadata for optimizing storage strategies within a dispersed storage network (DSN). The method begins with step 100, where a dispersed storage (DS) processing unit of the DSN generates a hint regarding data stored or to be stored. As an example, the generating the hint includes interpreting the data to determine one or more data characteristics of the data. As another example, the generating the hint includes interpreting ancillary data of the data to determine one or more storage requests (e.g., information that cannot be derived directly from the data (e.g., encryption type, access frequency, security requirements, non-modifiable, worm, etc.)). As a further example, the generating the hint includes interpreting an update to the ancillary data to determine updated storage requests. Note the hint includes one or more storage directives. Further note a storage directive includes one of, a type of data, a location constraint, a modification constraint, an access frequency, an expected access latency, a desired access latency, a security requirement, and a compression requirement.

When the data is stored, the method continues to step 114. When the data is to be stored, the method continues with step 104, where the DS processing unit divides the data into data segments. The method continues with step 106, where the DS processing unit dispersed storage error encodes a data segment of the data segments to produce a set of encoded data slices. The method continues with step 108, where the DS processing unit generates a set of hints based on the hint. The method continues with step 110, where the DS processing unit affiliates the set of hints with the set of encoded data slices to produce a set of affiliated encoded data slices. The method continues with step 112, where the DS processing unit sends the set of affiliated encoded data slices to a set of storage units of the DSN. A storage unit of the set of storage units stores an encoded data slice of the set of encoded data slices in accordance with a corresponding hint of the set of hints.

When the data is stored, the method continues to step 114, where the DS processing unit determines whether to send the hint as a unique message or embedded in a DSN. When the DS processing unit determines to send the hint as an embedded message, the method continues to step 120. When the DS processing unit determines to send the hint as a unique message, the method continues with step 116, where the DS processing unit creates a set of unique messages that includes slice names and hints appended to the slice names. The method continues with step 118, where the DS processing unit sends the set of unique messages to the set of storage units.

When the DS processing unit determines to send the hint as an embedded message, the method continues to step 120, where the DS processing unit appends the hint to a set of messages regarding the DSN message. The method continues with step 122, where the DS processing unit sends the set of messages to the set of storage units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    generating, by a dispersed storage (DS) processing unit of a dispersed storage network (DSN), a hint regarding data stored or to be stored, wherein the hint includes one or more storage directives;
    when the data is to be stored:
        dividing, by the DS processing unit, the data into data segments;
        dispersed storage error encoding, by the DS processing unit, a data segment of the data segments to produce a set of encoded data slices;
        generating, by the DS processing unit, a set of hints based on the hint;
        affiliating, by the DS processing unit, the set of hints with the set of encoded data slices to produce a set of affiliated encoded data slices; and
        sending, by the DS processing unit, the set of affiliated encoded data slices to a set of storage units of the DSN, wherein a storage unit of the set of storage units stores an encoded data slice of the set of encoded data slices in accordance with a corresponding hint of the set of hints:
    when the data is stored:
        determining whether to send the hint as a unique message or embedded in a DSN message of a plurality of DSN messages;
        when sending the hint as the unique message:
            creating a set of unique messages that includes slice names and the hint appended to the slice names; and
        when sending the hint as the embedded message:
            appending the hint to a set of messages regarding the DSN message.

2. The method of claim 1, wherein a storage directive of the one or more storage directives comprises one of:
    a type of data, a location constraint, a modification constraint, an access frequency, an expected access latency, a desired access latency, a security requirement, and a compression requirement.

3. The method of claim 1, wherein the generating the hint comprises one or more of:
    interpreting the data to determine one or more data characteristics of the data;
    interpreting ancillary data of the data to determine one or more storage requests; and
    interpreting an update to the ancillary data to determine updated storage requests.

4. The method of claim 1, wherein the affiliating the set of hints comprises:

appending the corresponding hint to the encoded data slice to produce an affiliated encoded data slice of the set of affiliated encoded data slices.

5. The method of claim 1, wherein the affiliating the set of hints comprises:
  appending the corresponding hint to a slice name of the encoded data slice to produce an affiliated encoded data slice of the set of affiliated encoded data slices.

6. The method of claim 1, wherein the generating the hint further comprises:
  generating a first hint that includes a first one or more desired storage directives; and
  generating a second hint that includes a second one or more desired storage directives, wherein one or more of the first one or more desired storage directives includes a different desired storage directive than one or more of the second one or more desired storage directives.

7. A dispersed storage (DS) processing unit of a dispersed storage network (DSN) comprises:
  memory;
  an interface; and
  a processing module, wherein the memory and the interface are operably coupled to the processing module, and wherein the processing module is operable to:
  generate a hint regarding data stored or to be stored, wherein the hint includes one or more storage directives;
  when the data is to be stored:
    divide the data into data segments;
    dispersed storage error encode a data segment of the data segments to produce a set of encoded data slices;
    generate a set of hints based on the hint;
    affiliate the set of hints with the set of encoded data slices to produce a set of affiliated encoded data slices; and
    send, via the interface, the set of affiliated encoded data slices to a set of storage units of the DSN, wherein a storage unit of the set of storage units stores an encoded data slice of the set of encoded data slices in accordance with a corresponding hint of the set of hints:
  when the data is stored:
    determine whether to send the hint as a unique message or embedded in a DSN message of a plurality of DSN messages;
    when sending the hint as the unique message:
      create a set of unique messages that includes slice names and the hint appended to the slice names; and
    when sending the hint as the embedded message:
      append the hint to a set of messages regarding the DSN message.

8. The DS processing unit of claim 7, wherein the processing module is operable to generate a storage directive of the one or more storage directives to include one of:
  a type of data, a location constraint, a modification constraint, an access frequency, an expected access latency, a desired access latency, a security requirement, and a compression requirement.

9. The DS processing unit of claim 7, wherein the processing module is operable to generate the hint by one or more of:
  interpreting the data to determine one or more data characteristics of the data;
  interpreting ancillary data of the data to determine one or more storage requests; and
  interpreting an update to the ancillary data to determine updated storage requests.

10. The DS processing unit of claim 7, wherein the processing module is operable to affiliate the set of hints by:
  appending the corresponding hint to the encoded data slice to produce an affiliated encoded data slice of the set of affiliated encoded data slices.

11. The DS processing unit of claim 7, wherein the processing module is operable to affiliate the set of hints by:
  appending the corresponding hint to a slice name of the encoded data slice to produce an affiliated encoded data slice of the set of affiliated encoded data slices.

12. The DS processing unit of claim 7, wherein the processing module is operable to generate the hint by:
  generating a first hint that includes a first one or more desired storage directives; and
  generating a second hint that includes a second one or more desired storage directives, wherein one or more of the first one or more desired storage directives includes a different desired storage directive than one or more of the second one or more desired storage directives.

13. A non-transitory computer readable memory device of a dispersed storage network (DSN) comprises:
  a first memory element for storing operational instructions that, when executed by a dispersed storage (DS) processing unit of the DSN, causes the DS processing unit to:
    generate a hint regarding data stored, wherein the hint includes one or more storage directives;
    when the data is to be stored:
      divide the data into data segments;
      dispersed storage error encode a data segment of the data segments to produce a set of encoded data slices;
      generate a set of hints based on the hint; and
      affiliate the set of hints with the set of encoded data slices to produce a set of affiliated encoded data slices;
    send the set of affiliated encoded data slices to a set of storage units of the DSN, wherein a storage unit of the set of storage units stores an encoded data slice of the set of encoded data slices in accordance with a corresponding hint of the set of hints;
    when the data is stored:
      determine whether to send the hint as a unique message or embedded in a DSN message of a plurality of DSN messages;
      when sending the hint as the unique message:
        create a set of unique messages that includes slice names and the hint appended to the slice names; and
      when sending the hint as the embedded message:
        append the hint to a set of messages regarding the DSN message.

14. The computer readable memory device of claim 13, wherein the first memory element stores further operational instructions that, when executed by the DS processing unit, causes the DS processing unit to:
  interpret the data to determine one or more data characteristics of the data;
  interpret ancillary data of the data to determine one or more storage requests; and
  interpret an update to the ancillary data to determine updated storage requests.

15. The computer readable memory device of claim 13, wherein the first memory element stores further operational instructions, that when executed by the DS processing unit, causes the DS processing unit to:

append the corresponding hint to the encoded data slice to produce an affiliated encoded data slice of the set of affiliated encoded data slices.

16. The computer readable memory device of claim 13, wherein the first memory element stores further operational instructions, that when executed by the DS processing unit, causes the DS processing unit to:

append the corresponding hint to a slice name of the encoded data slice to produce an affiliated encoded data slice of the set of affiliated encoded data slices.

17. The computer readable memory device of claim 13, wherein the first memory element stores further operational instructions that, when executed by the DS processing unit, causes the DS processing unit to:

generate a first hint that includes a first one or more desired storage directives; and generate a second hint that includes a second one or more desired storage directives, wherein one or more of the first one or more desired storage directives includes a different desired storage directive than one or more of the second one or more desired storage directives.

\* \* \* \* \*